July 18, 1950　　　　　F. G. KELLY　　　　　2,515,375
TORQUE-RESTORING DEVICE FOR ELECTRICAL INSTRUMENTS
Filed June 10, 1948
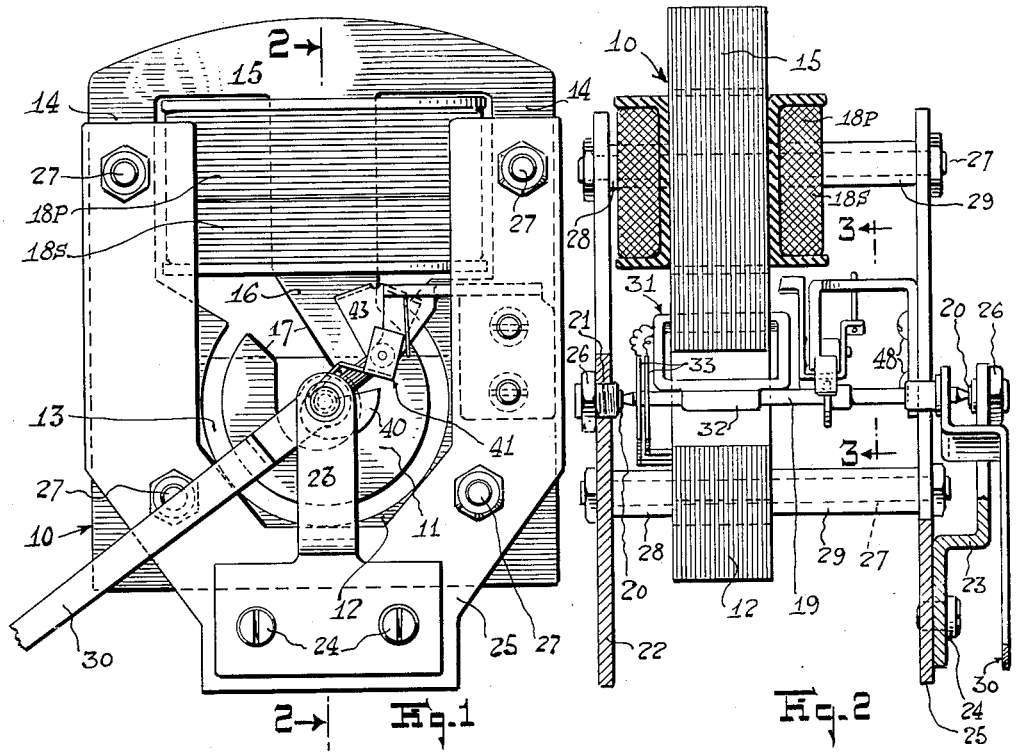
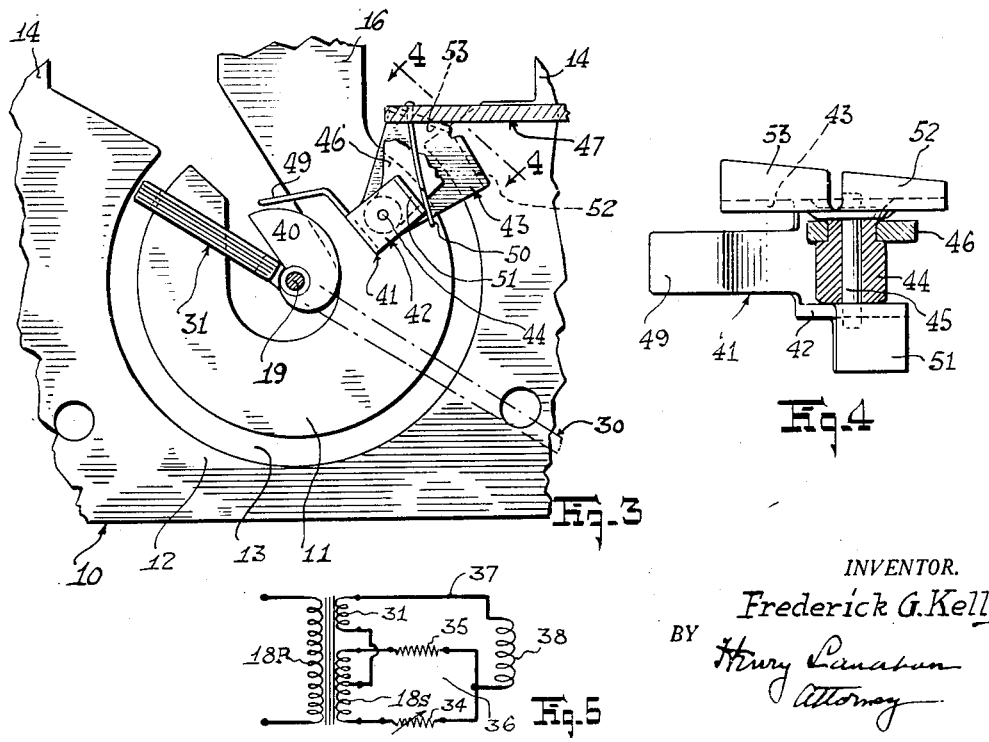
INVENTOR.
Frederick G. Kelly
BY Henry Lanahan
Attorney Patented July 18, 1950

2,515,375

UNITED STATES PATENT OFFICE 2,515,375

TORQUE-RESTORING DEVICE FOR ELECTRICAL INSTRUMENTS

Frederick G. Kelly, West Orange, N. J., assignor to Thomas A. Edison, Incorporated, West Orange, N. J., a corporation of New Jersey Application June 10, 1948, Serial No. 32,093

7 Claims. (Cl. 171—95)

This invention relates to electrical instruments of the type which have no actuating forces on their moving systems when the instruments are not in use—i. e., when the instruments are not connected to a source of excitation—such as ratiometers, frequency meters, certain types of electrodynamometer instruments, etc. More particularly, the invention relates to a novel torque-restoring device for such an instrument which is disabled so as not to have any torque influence on the moving system of the instrument when the instrument is in use.

In instruments of the character described, the moving systems thereof—hereinafter referred to as their rotors—are actuated under the influence of two opposing torques which are in balance at each indicating position of the instrument but neither of which is present when excitation of the instrument is removed. Accordingly in such instruments, the rotors tend to drift when the instruments are not in use. It is undesirable to let the rotor drift since the attendant may be unable to determine whether or not the instrument is in use and may be misled into taking a false reading. Accordingly it has been the custom to move the rotor indicator or pointer off the scale, or at least to return it to the zero marking of the scale, when excitation of the instrument is removed. This has commonly been done by providing the rotor with a restoring torque as by means of a torsion spring or a permanent or electromagnet. In instruments having very small actuating forces this restoring torque has had in some cases to be so small as to be ineffective in order to prevent instrument error during the use of the instrument, this being particularly true as to sensitive ratiometers and long-scale instruments of the type mentioned. To overcome this condition, it is oftentimes necessary to remove the restoring torque when the instrument is in use. The restoring-torque devices heretofore known have however been unsuitable both because they do not lend themselves readily to removal of the restoring torque and because they are generally inapplicable to long-scale instruments—i. e., instruments having scales longer than 180°. The restoring device of the present invention not only lends itself to easy removal of the restoring torque when excitation of the instrument is cut off but is also adapted for both long- and short-scale instruments. Objects of the present invention are to provide such an improved torque-restoring device for instruments, and also to provide such a device which is both simple and economical.

These and other objects and features of my invention will be apparent from the following description and the appended claims.

In the description of my invention reference is had to the accompanying drawings, of which:

Figure 1 is an axial view of a dynamometer type of measuring instrument in which a torque-restoring device according to my invention is incorporated;

Figure 2 is a sectional view taken substantially on the line 2—2 of Figure 1;

Figure 3 is a fractional section to enlarged scale taken substantially on the line 3—3 of Figure 2;

Figure 4 is a view, to still greater scale, of a portion of the torque-restoring device of my invention as seen from the line 4—4 of Figure 3, a hub portion of this device appearing however in section; and Figure 5 is a circuit diagram illustrating the operation of the dynamometer instrument herein shown.

Purely by way of illustration, I do herein show and describe my invention in connection with an electrodynamometer instrument of the character described and claimed in my pending application Serial No. 781,722, filed October 23, 1947 and entitled Dynamometer Systems. This is an indicating and/or measuring instrument of a long-scale type wherein the rotor is under the influence of two opposing torques produced electrically from a common source of potential but which are differentiated according to the quantity being measured so that the rotor will take positions according to the value of that quantity, each such position being one wherein the two actuating torques are in balance. This instrument may comprise a unitary field structure 10 formed of a stack of non-permanent magnetic laminations, as of silicon steel. The laminations are generally of rectangular shape but have corresponding inner portions thereof cut away to provide the field structure with an inner annular field pole 11 and an outer confronting field pole 12, the two poles being separated by an annular air gap 13 having a uniform width and a length, for example, of approximately 270°. The outer field pole has integral legs 14 at its ends which are in turn joined integrally to a transverse interconnecting yoke 15. One end of the inner annular field pole 11 is provided with an integral leg 16 which lies midway between the legs 14 in parallel relation thereto and which is joined integrally to a central portion of the yoke 15. The other or free end of the inner pole is separated from the leg 16 by an air gap 17 to provide a clearance opening for the mounting of a rotor coil as will hereinafter appear.

On the leg 16 there are primary and secondary field coils 18P and 18S of which the primary is supplied with alternating current, as from a 110-volt line, when the instrument is in use. This current produces a useful alternating flux in the annular air gap 13 which flows in a magnetic circuit from the inner leg 16 into the inner field pole 11, then uniformly across the gap 13 to the outer field pole 12 and next back through the legs 14 and yoke 15 to the central leg 16.

Extending axially through the opening at the center of the inner field pole 11 is a spindle 19 having cone pivots at its ends that seat in respective jewel bearings 20. These bearings are mounted in screws 21 one of which threads through a non-magnetic frame member 22 and the other of which threads through a non-magnetic bracket 23 held at 24 to a second frame member 25 similar to the member 22, the two jewel screws 21 being held in their adjusted positions by respective lock nuts 26. The two frame members 22 and 25 are mounted at opposite sides of the field structure 10 on four bolts 27, and are spaced respectively from the adjacent sides of the field structure by tubular spacers 28 and 29 which surround these bolts. The frame members are U-shaped and have their legs disposed at opposite sides of the air gap 13 (Figure 1). Secured to the spindle is a pointer 30 which is to register with the scale of a suitable dial not shown.

Also carried by the spindle 19 is a rotor coil 31 which surrounds the inner field pole 11 at a clearance distance therefrom, the coil being mounted on a suitable frame having mounting lugs 32 at one side thereof which embrace the spindle 19 (Figure 2). Current connections are made to the coil through light spiral springs 33 anchored for instance at their outer ends to the inner field pole 11.

A typical circuit of this instrument is briefly described by reference to Figure 5. The secondary coil 18S is center-tapped and connected to two resistors 34 and 35 to form an electrical bridge 36. One of these resistors, the resistor 34, is variable so as to vary the degree of unbalance of this bridge. Connected diagonally across the bridge is a circuit 37 serially including an inductance 38 and the rotor coil 31. The rotor coil has a voltage induced therein by reason of its magnetic coupling to the primary coil 18P, the magnitude of which varies with the angular positioning of the rotor. Likewise, the two sections of the secondary winding 18S have voltages induced therein by reason of their magnetic coupling with the primary winding 18P. These latter voltages are out of phase with respect to one another. Also, the bridge is arranged so that the net voltage appearing in the circuit 37 is in phase opposition to the voltage induced in the rotor coil. The magnitude of this voltage obtained from the bridge 36 depends on the variable resistor 34. As is clearly described in my aforementioned pending application Serial No. 781,722, the rotor seeks positions whereat the induced opposing voltages in the circuit 37—that is, the voltage induced in the rotor coil 31 and the voltage obtained from the bridge 36—are in balance. The effect of the inductance 38 is to phase the current in the circuit 37 in relation to the flux in the air gap 13 so that each position of torque balance of the rotor is a stable one—i. e., one whereat a slight deflection of the rotor in either direction from a balanced position will produce a torque unbalance tending to restore the rotor to its initial position. Thus, the rotor position depends upon the value of the resistor 34 or upon any quantity representable in terms of this resistor; however, the positioning of the rotor is substantially independent of the voltage source to which the primary coil 18P is connected since variations in this voltage source produce like changes in the two opposing voltages in the circuit 37.

In this dynamometer instrument all actuating torques on the rotor are removed when the primary coil 18P is disconnected from a source of current. Thus, during non-use of the instrument, the pointer 30 will tend to drift. This is usually undesirable and therefore it is the ordinary practice to provide instruments of this character with a drift-torque device which will move the pointer off the scale, or to a predetermined position on the scale, when excitation of the instrument is removed. However, this drift-torque device may produce an error if it has a torque influence on the rotor which is appreciable relative to the effective actuating torque produced as a result of the quantity being measured. In long-scale measuring instruments of the character mentioned, the actuating torque is generally low; in fact, in null-balance instruments such as are herein described, the actuating torque at each indicating position is approximately zero. Accordingly, in order to provide sufficient drift torque to move positively the pointer off the scale when the instrument is not in use, and yet avoid instrument error when the instrument is in use, it is well-nigh essential that the drift torque be wholly removed when the instrument is connected to a source of excitation for measuring or indicating purposes.

The drift-torque device of the present invention provides a positive drift torque to move the pointer off the scale as soon as excitation of the instrument is removed, but this device is disabled so as not to impose any torque on the rotor when the excitation is restored to put the instrument in use. This device, which is generally referred to as 39, comprises a spiral-shaped cam 40 mounted on the spindle 19 (see Figure 3), and a cooperating actuating member 41. This actuating member is a stamping of magnetic material, as of silicon steel, having a U-shaped portion with opposite legs 42 and 43 that embrace a bearing 44 and are pivoted thereto by a pin 45 on an axis parallel to the spindle 19. This pivot axis of the actuating member is in a plane about midway the width of the inner field pole 11 (Figure 3). The bearing 44 is staked to an arm 46 of a non-magnetic bracket 47 that is secured by screws 48 to the frame member 25. Extending from the central bridging part of this U-shaped portion of the actuating member is an arm 49 for slidably engaging the cam 40. The actuating member is urged counterclockwise, as it appears in Figure 3, so as to press the arm 49 against the cam 40 under the influence of a cantilever spring 50, the spring being anchored at one end to the bracket 47 and bearing at the other end against a bent-over lug 51 provided on the leg 42 of the actuating member. The other leg 43 of this actuating member is substantially sector-shaped as viewed along the pivot axis of the instrument and lies in the leakage flux field of the field poles 11 and 12 to serve as a magnetic vane for controlling the actuating member. To enhance this controlling effect of the vane, the same is provided with a pole at its outer end that extends towards the field poles, this pole being provided as two lugs 52 and 53 instead of one continuous pole only so as to facilitate the manufacture of the vane. The way in which this actuating member is controlled is as follows:

When the actuating member is in its most counterclockwise position—i. e., its operated position—about one-half of the magnetic vane 43 overlies the inner pole piece 11 and the remaining portion bridges the gap 13 between the field poles 11 and 12. When the primary coil 18P is energized to produce a flux field between the field poles 11 and 12, sufficient leakage or fringe flux spreads out from the poles to exert a clockwise torque on the vane, in view of the tendency thereof to align itself with the flux, and move the actuating member to the position it occupies in Figure 3. In this position of the actuating member the arm 49 thereof is held beyond the radius of the outermost portion of the cam 40 so that no drift torque is imposed on the rotor while the instrument is in use. When excitation of the instrument is removed, the arm 49 is pressed against the cam by the spring 50 so as to cam the rotor counterclockwise and move the pointer off the scale. The spiral face of the cam is burnished smooth, and the arm 49 is nickel plated and also burnished smooth so that friction between the cam and the arm is small. Typically, the cam face should have an angle of at least 25° at each point thereof to the radius line of the cam at that point.

It is desirable that the spring torque on the actuating member shall be nearly equal throughout the entire range of movement of the latter. This is accomplished by arranging the spring 50 so that it contacts the lug 51 at a maximum effective radius when the spring tension is at a minimum and at a proportionately less effective radius when the spring tension is at a maximum. For instance, in the unoperated position of the actuating member shown in Figure 3, the spring 50 has maximum tension and is nearly at right angles to the radius line through its point of contact with the actuating member; on the other hand, when the actuating member is in its operated position, the spring 50 has minimum tension and contacts the lug 51 at a point substantially on a line between the pivot axis of the actuating member and the supported end of the spring.

In order that the magnetic torque on the actuating member may match substantially the spring reaction torque on this member, the pole members 52 and 53 are tapered so that the end of the one nearest the gap 13, when the actuating member is in its operated position, will have the greater spacing from the adjacent field poles (Figures 3 and 4). This causes the magnetic torque to be reduced through the initial portion of the clockwise movement of the actuating member wherein the torque tends to be greatest, and tends therefore to equalize the magnetic torque throughout the range of movement of the actuating member.

Although the present torque-restoring device is particularly well suited to long-scale instruments, it obviously is even better suited to short-scale instruments for in the shorter-scale application the cam 40 can be made steeper for a given size thereof to provide the instrument with a stronger restoring torque. In any case the portion of the cam engaged by the actuating member will have a spiral face—i. e., one that recedes towards the pivot axis of the rotor at successive points along the cam.

The embodiment herein particularly shown and described is intended to be illustrative and not necessarily limitative of my invention since it is subject to changes and modifications without departure from the scope of my invention, which I endeavor to express according to the following claims.

I claim:

1. In a long-scale instrument of the type having a pivoted rotor which tends to drift when the instrument is not in use: the combination of a cam mounted on said rotor having a spiral face relative to the pivot axis of the rotor, said face having an angular length about said pivot axis greater than 180°; an actuating member mounted for movement towards the pivot axis of said rotor into sliding engagement with said face throughout substantially the full length thereof to move said rotor to an end position; and energizable means for holding said actuating member free of said cam.

2. In a long-scale instrument of the type having a pivoted rotor which tends to drift when the instrument is not in use: the combination of operating means energizable to produce an actuating torque on said rotor; a cam carried by said rotor having a spiral face relative to the pivot axis of the rotor, said face having an angular length about said pivot axis greater than 180°; a movable actuating member urged towards said pivot axis into sliding engagement with the face of said cam to turn said rotor to an end position; and means actuated by said operating means as the operating means is energized, for withholding said actuating member from said cam during operation of the instrument.

3. In a long-scale instrument of the type having a pivoted rotor which tends to drift when the instrument is not in use: the combination of operating means energizable to produce an actuating torque on said rotor; a cam carried by said rotor having a spiral face relative to the pivot axis of the rotor, said face having an angular length about said pivot axis greater than 180°; an actuating member mounted for movement towards said pivot axis into sliding engagement with said cam to move said rotor to an end position; means biasing said actuating member towards said cam with a force approximately equal through the range of movement of the actuating member; and means responsive to said operating means to restore said actuating member to an unoperated position against the force of said biasing means when said operating means is energized, said last-stated means being constructed and arranged also to exert an approximately equal force on said actuating member throughout the range of movement of the latter.

4. In a long-scale electrical instrument having a pivoted rotor which tends to drift when the instrument is not in use: the combination of an electromagnetic field structure including a coil energizable to produce a torque influence on said rotor to move the same according to a quantity to be measured; a cam carried by said rotor and having a spiral face with respect to the pivot axis of the rotor, said face having an angular length about said pivot axis greater than 180°; a movable actuating member urged towards said pivot axis into sliding engagement with said face to move said rotor to an end position; and a magnetic vane separate from said rotor and in a field of said electromagnetic structure without any substantial influence on said rotor for withholding said actuating member from said cam when said electromagnetic structure is energized.

5. The combination set forth in claim 4 wherein said magnetic vane is disposed in the leakage flux field of said electromagnetic field structure.

6. The combination set forth in claim 4 wherein said electromagnetic field structure has two confronting poles between which flows a useful magnetic field to produce a torque influence on said rotor when the electromagnetic field structure is energized, and said magnetic vane is disposed out of said useful magnetic field and operated only by the leakage flux between said poles.

7. In an electrodynamometer-type instrument having a magnetic field structure with confronting field poles, a primary coil energizable to produce a useful magnetic field between said poles, and a pivoted rotor including a coil disposed in said useful magnetic field and having a varying inductive coupling with said primary coil as the rotor is moved: the combination of a cam carried by said rotor having a spiral cam face relative to the pivot axis of the rotor; a pivoted actuating member urged against said cam to move said rotor to a predetermined position; and a magnetic vane, carried with said actuating member and disposed in the magnetic field of said field structure, for withholding said actuating member from said cam when said primary coil is energized.

FREDERICK G. KELLY.

REFERENCES CITED

The following references are of record in the file of this patent:

UNITED STATES PATENTS

| Number | Name | Date |
|---|---|---|
| 751,015 | Robinson | Feb. 2, 1904 |
| 2,382,295 | Conrad | Aug. 14, 1945 |
| 2,382,315 | Hiller | Aug. 14, 1945 |